May 5, 1942.  G. A. RANDALL  2,281,997
SUBMARINE CABLE SIGNAL SHAPING SYSTEM
Filed Dec. 3, 1940  2 Sheets-Sheet 1
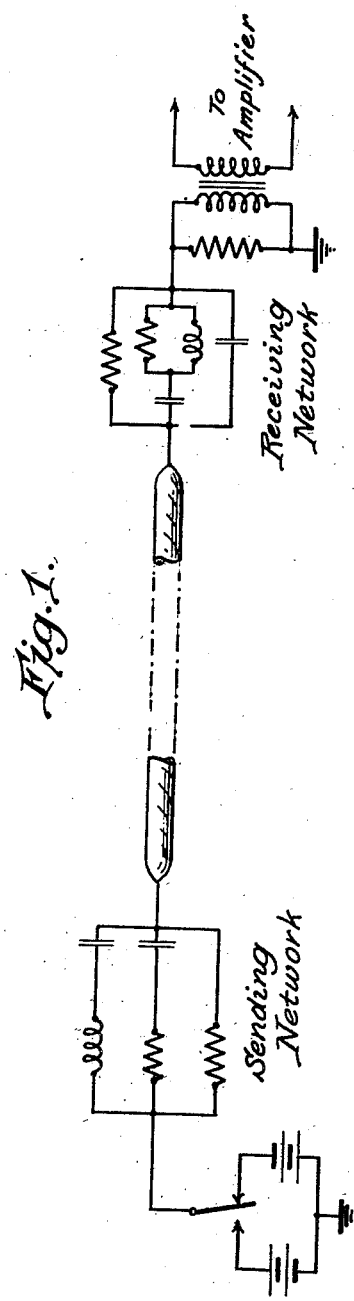
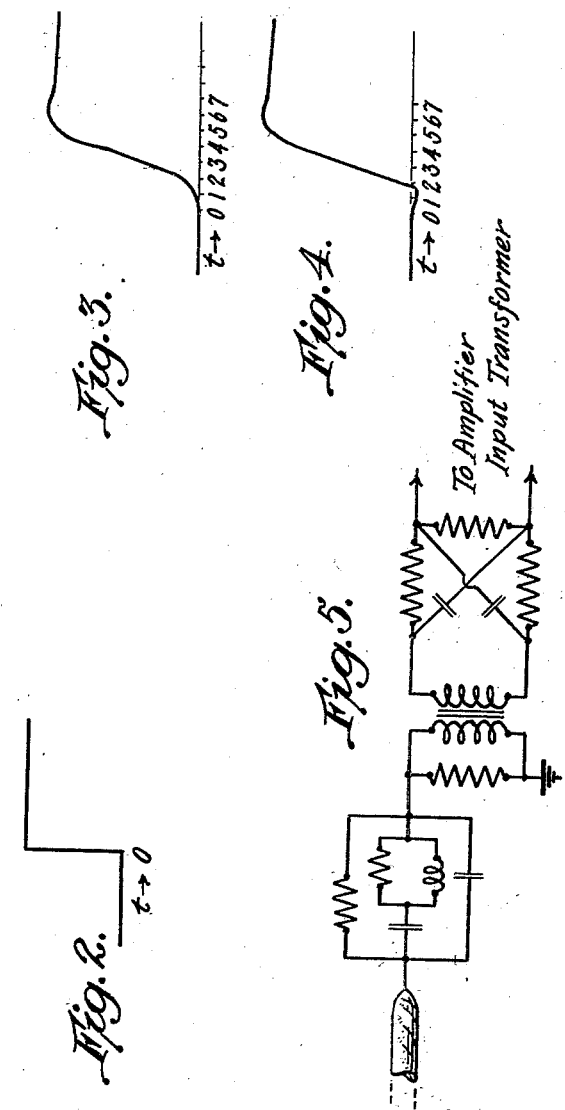
Inventor
Gerald A. Randall
Eugene C. Brown
Attorney May 5, 1942.　　　　　G. A. RANDALL　　　　　2,281,997
SUBMARINE CABLE SIGNAL SHAPING SYSTEM
Filed Dec. 3, 1940　　　　　2 Sheets-Sheet 2
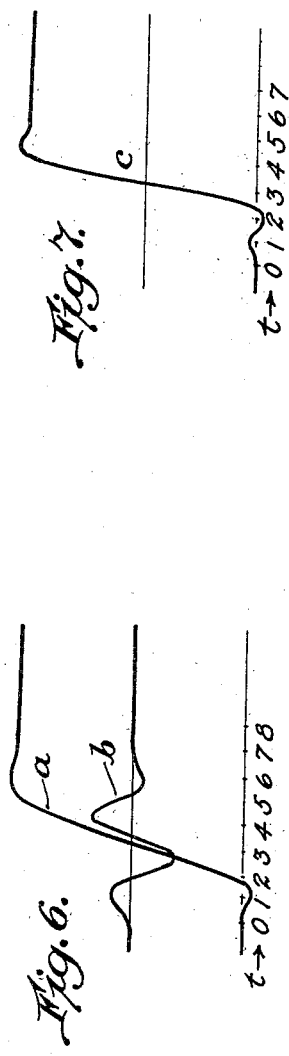
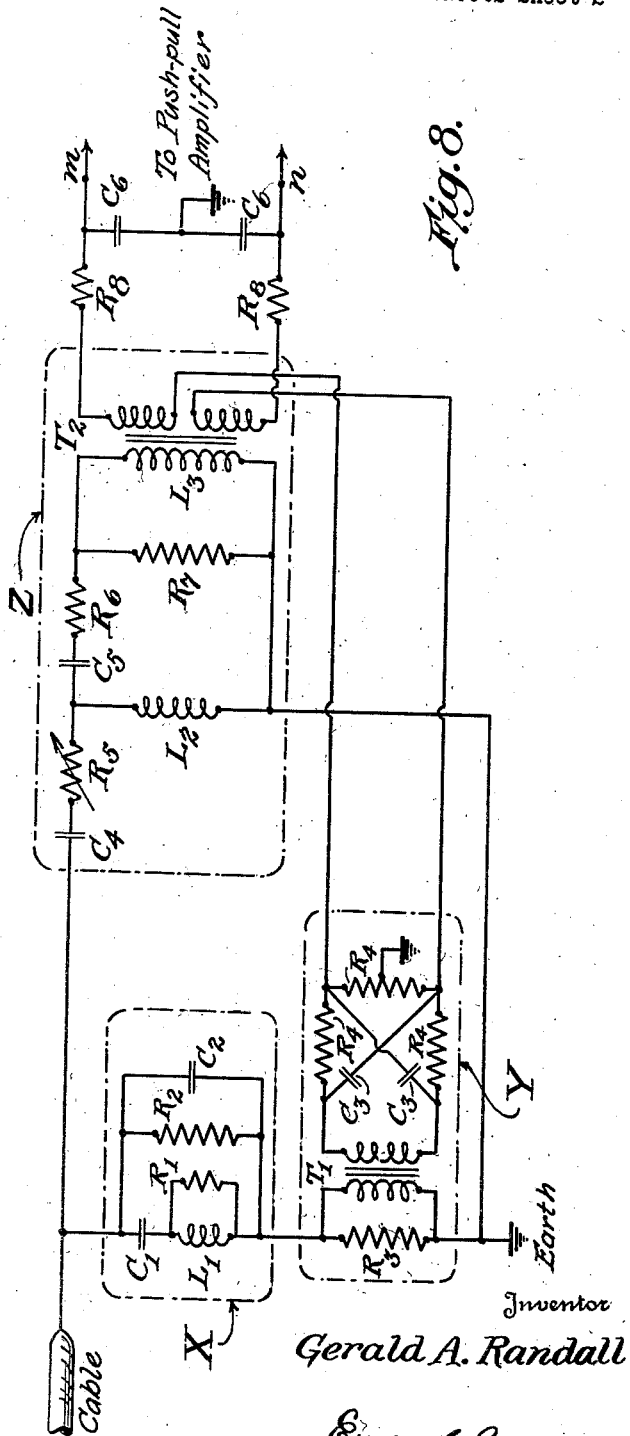
Inventor
Gerald A. Randall
Eugene C. Brown
Attorney Patented May 5, 1942

2,281,997

UNITED STATES PATENT OFFICE 2,281,997

SUBMARINE CABLE SIGNAL SHAPING SYSTEM

Gerald A. Randall, Merrick, N. Y., assignor to The Western Union Telegraph Company, New York, N. Y., a corporation of New York Application December 3, 1940, Serial No. 368,411

9 Claims. (Cl. 178—63)

This invention relates to systems for transmitting electrical signals and is applicable particularly to submarine cables of the continuously loaded type in which it is desired to correct the wave form of signaling impulses which have been distorted during transmission.

It is characteristic of submarine cables that during transmission the high frequency components of the signal impulses are considerably advanced in phase as well as being attenuated in amplitude with respect to the lower frequency components of the impulses. The necessity for restoring these components of the received impulses to approximately their original amplitude and phase relations in order to operate receiving instruments has been a recognized major difficulty in the design of signal shaping systems for loaded cables and an important though less serious problem in the case of non-loaded cables.

Inasmuch as attenuation increases rapidly with frequency in long submarine cables, the transmission is limited to a very narrow range of frequencies. Formerly it has been necessary for relay operation to receive a frequency range of at least 1.65 $f$, where $f$ is the dot frequency, under the best attainable conditions of phase restoration (see Milnor, Trans. A. I. E. E., 1922, p. 20). One severe limitation in common forms of cable shaping networks is that the networks in order to permit reasonably perfect manipulation of the frequencies at 1.65 $f$, must bear a decreasingly effective range reaching up to say 2.5 $f$. The receiving system, therefore, while receiving in some measure higher frequency signal components, at the same time is open to the passage of the interference currents which are particularly severe in this adjacent high frequency range.

In high speed loaded cables, the comparatively wide range of frequencies received and the sharply curved phase characteristic, make the problem of restoring the frequency components to their proper phase relation, a major difficulty in the design of shaping systems. This is also an important though less serious problem in the case of non-loaded cables.

The restoration of the frequency components to their proper value and position has been greatly improved by largely segregating the frequency selective and phase shifting functions into separate networks. A further type of shaping system has been developed in which the received signal range was divided into two portions and each portion then separately shaped with respect to both phase and amplitude. This system has proved highly effective, particularly upon non-loaded cables where the phase displacements are largely corrected coincidentally with the large amount of amplitude correction required.

The objects of my invention are: To provide a signal shaping system wherein a lower frequency transient and a higher frequency transient are separately formed and subsequently combined in such a manner as to form a substantially perfect final signal; and to narrow the necessary frequency range for the reception of a given signaling speed, thereby excluding interference of adjacent higher frequencies.

A unique feature of this invention is that the inherent disparity in arrival time in loaded cables, of the lower and higher frequency components is deliberately utilized in placing the two normally displaced transients in proper juxtaposition at the common input circuit of the receiving amplifier. Another unique feature is that at the most critical point of the final signal, i. e., the center of the reversal, the frequency components are exactly in phase as well as being of the proper magnitude. As a consequence of this perfect phase restoration, a wave front is secured whose steepness corresponds to the best formerly obtainable with a received frequency range of 1.65 $f$, and is obtained in the present case with a required range of only 1.35 $f$. By thus narrowing the necessary frequency range for the reception of a given signaling speed, a higher speed may be attained for the same signal margin and at the same time interference of adjacent higher frequencies is excluded.

The invention will now be described in detail, reference being made to the accompanying drawings, in which—

Figure 1 illustrates diagrammatically a submarine cable equipped with transmitting and receiving signal shaping networks.

Figure 2 indicates the wave-front of a transmitted signal impulse.

Figure 3 illustrates the arrival curve of a signal impulse at the receiving end of the cable having the shaping network of Figure 1.

Figure 4 shows an improvement in the curve of the signal wave of Figure 3, which may be attained by the addition of a shaping network of the form shown in Figure 5.

Figure 6 illustrates at $a$ and $b$ the two transients of the received signal impulse which are developed in the shaping networks of the present invention and combined to produce the wave shown in Figure 7.

Figure 8 is a diagram of the receiving shaping networks embodying the present invention.

When a squared topped signal impulse as shown in Figure 2 is applied to the transmitting end of a long inductively loaded ocean cable having a full shaping network at the sending end but incomplete shaping at the receiving end, as indicated in Figure 1, the arrival curve of the signal impulse is of the form indicated in Figure 3. The time of propagation for the circuit is not indicated, but on a loaded cable circuit .20 to .35 second may elapse between the time the voltage is applied at the sending end of the circuit and the start of the signal wave at the receiving end, indicated at $t=0$ units on Figure 3. The receiver signal shaping system shown here comprises essentially a shunted condenser in series with a resistance, the voltage across the resistance being transmitted by a high inductance transformer. The received signal transient shown in Figure 3, requires 7 units of time to reach steady state value (except for a slow drift to zero after that time). Most of the transient takes place between $t=1$ and $t=5$, or 4 units net. Hence a reasonable telegraph signalling frequency would be one where the dot time is 4 units. In order to increase the signalling speed, it is necessary that the duration of the transient be reduced.

Some improvement over the transient shape of Figure 3 may be made by the addition of a Wheatstone bridge circuit to the secondary side of the input transformer, as shown in Figure 4. This network serves to select certain of the high frequency components and apply them reversed in phase at the initiation of the signal rise. While the amplitude of the signal is greatly reduced, (not shown in the illustration), an improvement in shape is effected by reversing the polarity of the initial slow rise. At the same time the overthrow of Figure 3 is reduced somewhat and the whole useful part of the arrival curve is slightly retarded. Dot time for this arrival curve might be 3 units, which is an improvement over Figure 3.

One of the purposes of this invention is to greatly lessen the time required for a signal impulse to pass from one steady state value to the other. In order to accomplish this purpose, high frequency components which have arrived in the advance portion of the main arrival wave are shaped into a damped oscillation of approximately two cycles length and of the proper magnitude and phase relation to provide a supplemental transient that may be combined with the main transient to produce the desired substantially perfect signal wave.

In Figure 6 said properly shaped damped oscillation is indicated by the curve $b$, superposed upon the curve of the main transient $a$ of Figure 4. It will be observed that the major or central portion of this oscillation coincides approximately with the primary transient at the zero or reversal position, while the lesser terminal portions are in opposing phase with the beginning and end of the main transient. As indicated in Figure 7, the summation of the main and supplemental transients produces a much steeper abruptly terminated wave $c$, which is far less susceptible to high frequency interference, such as static, telegraph cross-fire and duplex unbalance. The number of time units, required in the transient wave of Figure 3, has been approximately halved. Ideally, with the transients $a$ and $b$ perfectly symmetrical, they should coincide at the zero current position. However to produce the most effective final shape, it has been found desirable in practice to slightly delay the supplemental transient at the zero position, as indicated.

Supplemental transients of other forms, in which the emphasis is placed upon either the upper or lower half cycle may alternatively be employed. However, it has been determined that the symmetrical form shown produces the greater freedom from interference. Frequency analysis of the wave of Figure 7 has shown that all the frequency components received are in phase substantially at a point midway between the steady state levels preceding and following the transient period. This fact finds corroboration in the symmetrical nature of the component transients and resultant wave form of Figure 7.

This shaping system which involves the superposition of a damped shaped symmetrical oscillation upon a primary transient in unique phase relation is totally distinct from prior methods which employ a process of successively creating a number of higher derivatives of the incoming signal wave (arrival curve) and subsequently combining these derivatives to form a substantially square topped wave. It is necessary to combine derivatives up to a relatively high order. No tuning is involved, nor is any phasing employed for the purpose of relocating any of the derivatives to a more advantageous position.

A shaping system embodying the present invention which will produce and combine the two transients of Figure 6, in the manner described, is illustrated in Figure 8.

Signal currents arriving from the cable flow to earth through the two networks X and Z which are designed to separate the signal frequency components into exclusive lower and upper ranges. The network X which comprises basically the resonant circuit $C_1L_1$ in which $L_1$ is shunted by a resistance $R_1$ is designed to select the lower frequency components of the cable signal and to produce a transient of the form of Figure 3. Condenser $C_2$ and resistance $R_2$ both in shunt to the resonant circuit are provided for the purpose of sharpening the rise of the transient and for lengthening its delay respectively, as needed. This lower frequency transient then traverses the primary winding of transformer $T_1$ to earth. The shunting resistance $R_3$ regulates the time constant of the transformer to control the decay and to some extent the amplitude of the signal. From the secondary of transformer $T_1$ this transient proceeds through a bridge shaped phase shifting network comprising the two condensers $C_3$ and the three resistances $R_4$ and thence conductively to the input of the receiving amplifier via the ground terminals of the secondary of input transformer $T_2$. The phase shifting network functions as described previously to give to the transient the form illustrated in Fig. 4 and again in Fig. 6, curve $a$.

The higher frequency components are selected by the network Z which comprises essentially two coupled damped series resonant circuits composed of the elements $C_4R_5L_2$ and $C_5R_6L_3$, respectively. The resistance $R_7$ serves to control the time constant of the transformer $T_2$ and also provides a magnitude control of the high frequency transient additional to the damping resistances $R_5$ and $R_6$. This high frequency network functions as a pair of damped coupled circuits tuned to slightly different frequencies to produce a damped oscillation of controllable length and symmetrical rise and fall. The transient thus produced, outlined by curve $b$ of Fig. 6 is applied to the amplifier input via the primary of transformer $T_2$, which may constitute the inductance $L_3$. It should now be apparent that a major transient $a$ comprised of the low frequency components of the signal after selection by the network X and reshaping and positioning by the network Y is applied to the input of the signal amplifier simultaneously with a high frequency transient $b$ which has been selected and then uniquely shaped by the network Z. These two component waves combine to form the highly satisfactory signal wave front of Figure 7.

The input transformers, $T_1$ and $T_2$ are provided with electrostatic shields between primary and secondary windings and may require magnetic shielding if followed by high gain amplifiers. $T_1$ has a high impedance high time-constant primary, and a primary to secondary turn ratio near unity. $T_2$ has a low impedance low time-constant primary, and a high ratio of secondary turns to primary turns. A maximum ratio of 15:1 or even 20:1 may be desirable, smaller ratios being obtained by suitable taps on the windings.

To adjust the two transients into proper relative position, the transient $a$ may be shifted bodily along the time axis with but slight variation in the general shape by adjusting the condensers $C_3$. For a fine adjustment transient $b$ may be shifted by manipulating the resistance $R_5$. The relative amplitudes are controlled primarily by means of taps on the transformer $T_2$. The length and the frequency of the transient $b$ are determined by the tuning of the two coupled resonant circuits $C_4L_2$ and $C_5L_3$. For example, to receive signals where $f$ was 80 cycles, these circuits might have natural periods of $1.4 f$ and $1.7 f$ respectively, to produce a combined or joint characteristic in the neighborhood of the lower frequency. The resistance $R_8$ and the condensers $C_6$ shown in the secondary circuit of the input transformer $T_2$ serve to suppress unwanted high frequency interference.

In the case illustrated in Fig. 6 the first half cycle of transient $b$ represents the normal arrival time of the high frequency signal components, their entire energy being concentrated in a single transient at this position. This period is considerably in advance of the low frequencies and so in former systems of this type it has been necessary either to endeavor to delay this transient by means of delay networks so that it could be combined with the low frequency components in proper juxtaposition or to build it up into a major transient itself for latter combination with a minor low frequency transient. In the shaping system of the present invention, however, this high frequency transient is impressed instead upon the sharply turned or highly oscillatory network Z which lengthens the transient to an oscillation of approximately two cycles length with the energy principally concentrated at its center. The center of this high frequency oscillation then joins as precisely as desired with the center of the low frequency transient to steepen its rise while the terminal portions enter significantly into the squaring up of the initial and final portions. By employing this unique method of selecting, reorienting, and recombining the high frequency and the low frequency components of a telegraph signal not only is a superior signal shape attained but it is accomplished with a minimum of equipment, there is less sacrifice of signal voltage and the procedure for obtaining the final shape is greatly simplified. Also, due to the improved phasing of the components it is unnecessary to receive frequencies as high as is ordinarily necessary and as the network Z for selecting the high frequencies is sharply tuned, a sharp upper cut-off to the overall frequency characteristic of the system results. These two latter factors by decreasing the essential received frequency range very greatly enhance immunity to interference at any given signaling speed, or conversely this advantage may be capitalized by increasing the signaling speed.

All resistors, capacitors and inductors may be individually adjusted in value to provide the desired shape for a particular signalling speed on any particular cable. Typical values, which were found suitable for operation on a loaded cable 1350 miles in length at 80 cycles per second dot frequency are as follows:

| | | | |
|---|---|---|---|
| $C_1$ | 5 mfd. | $R_1$ | 4,000 ohms. |
| $C_2$ | .2 mfd. | $R_2$ | 250,000 ohms. |
| $C_3$ | .025 mfd. each. | $R_3$ | 1,000 ohms. |
| $C_4$ | .3 mfd. | $R_4$ | 100,000 ohms, the midpoint of one being earthed as indicated. |
| $C_5$ | .3 mfd. | | |
| $C_8$ | .001 mfd. each. | | |
| $L_1$ | 180 henrys. | $R_5$ | 3,000 ohms. |
| $L_2$ | 6.5 henrys. | $R_6$ | 8,000 ohms. |
| | | $R_7$ | 2,500 ohms. |
| $T_2$ | 2.8 henrys primary. | $R_8$ | 100,000 ohms each. |

Terminals $m$—$n$ of the condensers $C_6$ in Figure 8 are connected to the grids of the first stage tubes of a high gain push-pull amplifier. The frequency response of the amplifier is substantially linear over the important range of frequencies passed by the shaping networks. The purpose of condensers $C_6$, is to assist in removing unnecessary high frequency components of signals and interference. As large a value of capacity is used as is consistent with good signal shape. If additional suppression of high frequency interference is needed, it may be accomplished by means of a condenser of suitable size located in shunt to any stage or the output of the amplifier.

While the foregoing cable receiving system has been described and is particularly applicable with respect to loaded cables, it may also be used with non-loaded cables though supplemental delay networks in the low frequency path may be required. Further, the shaping system as illustrated is applicable only to a one way cable; for balanced duplex working obviously the network should be constructed in symmetrical fashion.

It will be evident to engineers that various modifications of the circuit arrangements shown may be made within the scope of this invention as defined in the appended claims.

I claim:

1. The method of shaping the wave form of circuit impulses, which consists in producing from the arrival current a main non-oscillatory signal transient and an auxiliary oscillatory transient having its central portion coincide approximately with said main transient at the zero or reversal position and combining said transients to produce a current impulse having a wave form of steeper slope and shorter duration than the arrival current wave.

2. The method of shaping the wave form of current impulses, which consists in segregating the low frequency and the higher frequency components of the arrival current, producing from the low frequency a main signal transient, producing from the higher frequency a damped oscillatory transient, superposing said transients in juxtaposition so that the major or central portion of the oscillatory transient coincides approximately with the main transient at the zero or reversal position and the lesser terminal portions are in opposing phase with the beginning and end of the main transient.

3. The method of shaping the wave form of current impulses, which consists in segregating the low frequency and the higher frequency components of the arrival current, producing from the low frequency a main signal transient having an initial reversed polarity portion, producing from the higher frequency an oscillatory transient of controllable length and symmetrical rise and fall, and superposing said transients in a manner to produce a resultant wave form of steeper slope abruptly terminated and of shorter duration than the arrival current wave.

4. A wave form shaping system, comprising means to segregate the low frequency components from the higher frequency components of the arrival current impulses, means for shaping and retarding a main transient from the low frequency components, means for producing from said higher components an oscillatory transient of controllable length and means for superposing said transients and adjusting their phase relation so that the major central portion of the oscillatory transient coincides approximately with the main transient at the zero or reversal portion, whereby the resultant combined wave is steeper and of shorter duration than said main transient.

5. A wave form shaping system, comprising means to segregate the low frequency components from the higher frequency components of the arrival current impulses, means for shaping and retarding a main transient, means for producing from said higher components an oscillatory transient of controllable length and having symmetrical rise and fall, and means for superposing said transients and adjusting their phase relation so that the major central portion of the oscillatory transient coincides approximately with the main transient at the zero or reversal position, while the lesser terminal portions are in opposing phase with the beginning and the end of the main transient, whereby the resultant combined wave is steeper, more abruptly terminated and of shorter duration than said main transient.

6. A wave form shaping system, comprising means to segregate the low frequency components from the higher frequency components of the arrival current impulses, means for shaping a main transient from the low frequency components, means for producing from the higher components a damped oscillatory transient, means for retarding the phase of said main transient with respect to said oscillatory transient and means for superposing said transient to produce a resultant signal impulse.

7. A wave form shaping system, comprising means to segregate the low frequency components from the higher frequency components of the arrival current impulses, means for shaping a main transient from the low frequency components, means for producing from the higher components a damped oscillatory transient, means adjusting the phase relation of said transients so that the oscillatory transient shall pass through zero while the main transient is approximately midway in amplitude between its original and final steady values and means for combining said transients to form a resultant signal impulse.

8. A wave-form shaping system, comprising means to segregate the low frequency components from the higher frequency components of the arrival current impulses, means for shaping a main transient from the low frequency components, means for producing from the higher components a damped oscillatory transient and timing its position relative to the main transient so that when superposed the second half cycle of the oscillatory transient opposes the initial rise of the main transient and the third half cycle of the oscillatory transient assists the final rise of the main transient.

9. In a signal receiving system, a network for segregating the low frequency components and the high frequency components of the arriving impulses into separate paths, a network in one path for producing from the low frequency components a non-oscillatory main signal transient having a wave form approximating the wave form of the arrival current with a reversed phase initial portion, another path having two coupled resonant networks adjustable to different frequencies for producing from the higher frequencies a damped oscillatory transient of predetermined wave form and means for combining said transients in a single output circuit in proper phase relation to produce a resultant signal impulse having a steep wave front with abrupt terminals and of short duration.

GERALD A. RANDALL.